US008341629B2

(12) United States Patent
Williams et al.

(10) Patent No.: US 8,341,629 B2
(45) Date of Patent: *Dec. 25, 2012

(54) METHOD AND SYSTEM FOR PROVISIONING A VIRTUAL COMPUTER AND SCHEDULING RESOURCES OF THE PROVISIONED VIRTUAL COMPUTER

(75) Inventors: Gregory A. Williams, Colorado Springs, CO (US); Mark A. Son-Bell, Los Altos, CA (US); Carl F. Meske, Jr., San Jose, CA (US); Arieh Markel, Lafayette, CO (US); Peter H. Schow, Longmont, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/069,774

(22) Filed: Mar. 23, 2011

(65) Prior Publication Data

US 2011/0173614 A1  Jul. 14, 2011

Related U.S. Application Data

(63) Continuation of application No. 11/369,515, filed on Mar. 7, 2006, now Pat. No. 7,941,801.

(51) Int. Cl.
  *G06F 9/455* (2006.01)
  *G06F 9/46* (2006.01)
  *G06F 15/173* (2006.01)
(52) U.S. Cl. ............... 718/1; 718/104; 709/226
(58) Field of Classification Search ........... None
  See application file for complete search history.

(56) References Cited

U.S. PATENT DOCUMENTS

| | | | | |
|---|---|---|---|---|
| 6,247,026 B1* | 6/2001 | Waldo et al. | ............ | 1/1 |
| 6,327,596 B1* | 12/2001 | Wollrath et al. | ............ | 1/1 |
| 6,421,704 B1* | 7/2002 | Waldo et al. | ............ | 718/104 |
| 6,449,648 B1* | 9/2002 | Waldo et al. | ............ | 709/226 |
| 6,499,049 B2* | 12/2002 | Waldo et al. | ............ | 718/104 |
| 6,519,615 B1* | 2/2003 | Wollrath et al. | ............ | 1/1 |
| 6,564,240 B2* | 5/2003 | Waldo et al. | ............ | 718/104 |
| 6,970,902 B1* | 11/2005 | Moon | ............ | 709/201 |
| 7,415,512 B1* | 8/2008 | Moon | ............ | 709/220 |
| 7,577,722 B1* | 8/2009 | Khandekar et al. | ............ | 709/220 |
| 2004/0236852 A1* | 11/2004 | Birkestrand et al. | ............ | 709/226 |
| 2005/0060704 A1* | 3/2005 | Bulson et al. | ............ | 718/1 |
| 2006/0184935 A1* | 8/2006 | Abels et al. | ............ | 718/1 |
| 2006/0184936 A1* | 8/2006 | Abels et al. | ............ | 718/1 |
| 2006/0184937 A1* | 8/2006 | Abels et al. | ............ | 718/1 |
| 2007/0180448 A1* | 8/2007 | Low et al. | ............ | 718/1 |

OTHER PUBLICATIONS

Grit et al, "Virtual Machine Hosting for Networked Clusters: Building the Foundations for "Autonomic" Orchestra", IEEE, 2006, pp. 1-8.*
Irwin et al, "Sharing Networked Resources With Brokered Leases", USENIX, May 2006; pp. 1-27.*

* cited by examiner

*Primary Examiner* — Jennifer To
(74) *Attorney, Agent, or Firm* — Osha Liang LLP

(57) ABSTRACT

A method for virtual computing that includes receiving a virtual computer specification, wherein the virtual computer specification defines a plurality of hardware and software configuration requirements for a virtual computer and a duration requirement for use of the virtual computer, requisitioning a plurality of computing resources based on the plurality of hardware and software configuration requirements, provisioning the plurality of computing resources from a pool of computing resources to obtain a provisioned virtual computer, and scheduling the plurality of computing resources of the provisioned virtual computer for use based on the duration requirement.

18 Claims, 5 Drawing Sheets

METHOD AND SYSTEM FOR PROVISIONING A VIRTUAL COMPUTER AND SCHEDULING RESOURCES OF THE PROVISIONED VIRTUAL COMPUTER

This application is a continuation of U.S. patent application Ser. No. 11/369,515, now U.S. Pat. No. 7,941,801, entitled "METHOD AND SYSTEM FOR PROVISIONING A VIRTUAL COMPUTER AND SCHEDULING RESOURCES OF THE PROVISIONED VIRTUAL COMPUTER", filed on Mar. 7, 2006, and issued on May 10, 2011. U.S. Pat. No. 7,941,801 is incorporated herein by reference.

BACKGROUND

Technology is rapidly expanding in the fields related to computer systems. Specifically, new ideas related to hardware (e.g., design of processors, design of memory, materials for circuitry, and other such hardware advances) and software (e.g., new features and more efficient use of a computer system) are continually being explored. The rapid expansion of technology has created an environment in which the current personal computers surpass the abilities of the super computers of twenty years ago and the current super computers exceed previous expectations.

In order to take advantage of the technological advances, individuals, companies, and other such organizations must buy new computer systems when the old computer systems are outdated. Typically, buying a computer system involves a buyer contacting a merchant to purchase the computer system matching advances in technology with respect to the needs of the individual or organization.

Computer systems may be bought fully built, fully customized, or any combination thereof. A fully built computer system is any computer system that is built before a buyer decides to purchase the computer system. Once a buyer purchases the computer system, the buyer receives the computer system, unpacks the computer system, and installs any software the buyer may require. A buyer may spend several hours working on the computer system after purchase before the computer system is available to use.

Alternatively, the buyer may buy a fully or partially customized computer system. In order to buy a customized computer system, the buyer contacts a merchant and specifies a configuration (e.g., the amount of memory, processor type, external drives, and other such configuration requirements). Once the order is received by the merchant, the computer system is built and shipped a few days later to the buyer. The buyer then unpacks the computer system and installs any desired software not previously installed. Unpacking the computer system requires the buyer to set aside space for the computer system, physically assemble the computer system, and ensure that all configuration steps are performed for using the computer system. Accordingly, the computer system is available only after the buyer receives the computer system and installs the software.

In order to use a computer system immediately and as an alternative to buying a computer system, a user may physically enter a retail store, such as an Internet Café or library, and use an available generic computer system for a specific time period. Such computer systems are typically pre-installed with basic software (e.g., operating system, word processing application, Internet browser). Once the user has completed using the generic computer system, the user stores the information on a removable storage device, such as a jump drive, floppy disk, etc. and leaves the generic computer system available for the next user.

SUMMARY

In general, in one aspect, the invention relates to a method for virtual computing that includes receiving a virtual computer specification, wherein the virtual computer specification defines a plurality of hardware and software configuration requirements for a virtual computer and a duration requirement for use of the virtual computer, requisitioning a plurality of computing resources based on the plurality of hardware and software configuration requirements, provisioning the plurality of computing resources from a pool of computing resources to obtain a provisioned virtual computer, and scheduling the plurality of computing resources of the provisioned virtual computer for use based on the duration requirement.

In general, in one aspect, the invention relates to a system for virtual computing that includes a client manager configured to receive a virtual computer specification, wherein the virtual computer specification defines a plurality of hardware and software configuration requirements for a virtual computer and a duration requirement for use of the virtual computer. The client manager is further configured to requisition a plurality of computing resources based on the plurality of hardware and software configuration requirements. The system also includes a master server connected to the client manager configured to provision the plurality of computing resources from a pool of computing resources to obtain a provisioned virtual computer, and schedule the plurality of computing resources of the provisioned virtual computer for use based on the duration requirement.

In general, in one aspect, the invention relates to a computer usable medium comprising computer readable program code embodied therein for causing a computer system to receive a virtual computer specification, wherein the virtual computer specification defines a plurality of hardware and software configuration requirements for a virtual computer and a duration requirement for use of the virtual computer, requisition a plurality of computing resources based on the plurality of hardware and software configuration requirements, provision the plurality of computing resources from a pool of computing resources to obtain a provisioned virtual computer, and schedule the plurality of computing resources of the provisioned virtual computer for use based on the duration requirement.

Other aspects and advantages of the invention will be apparent from the following description and the appended claims.

DETAILED DESCRIPTION

Figure 1:
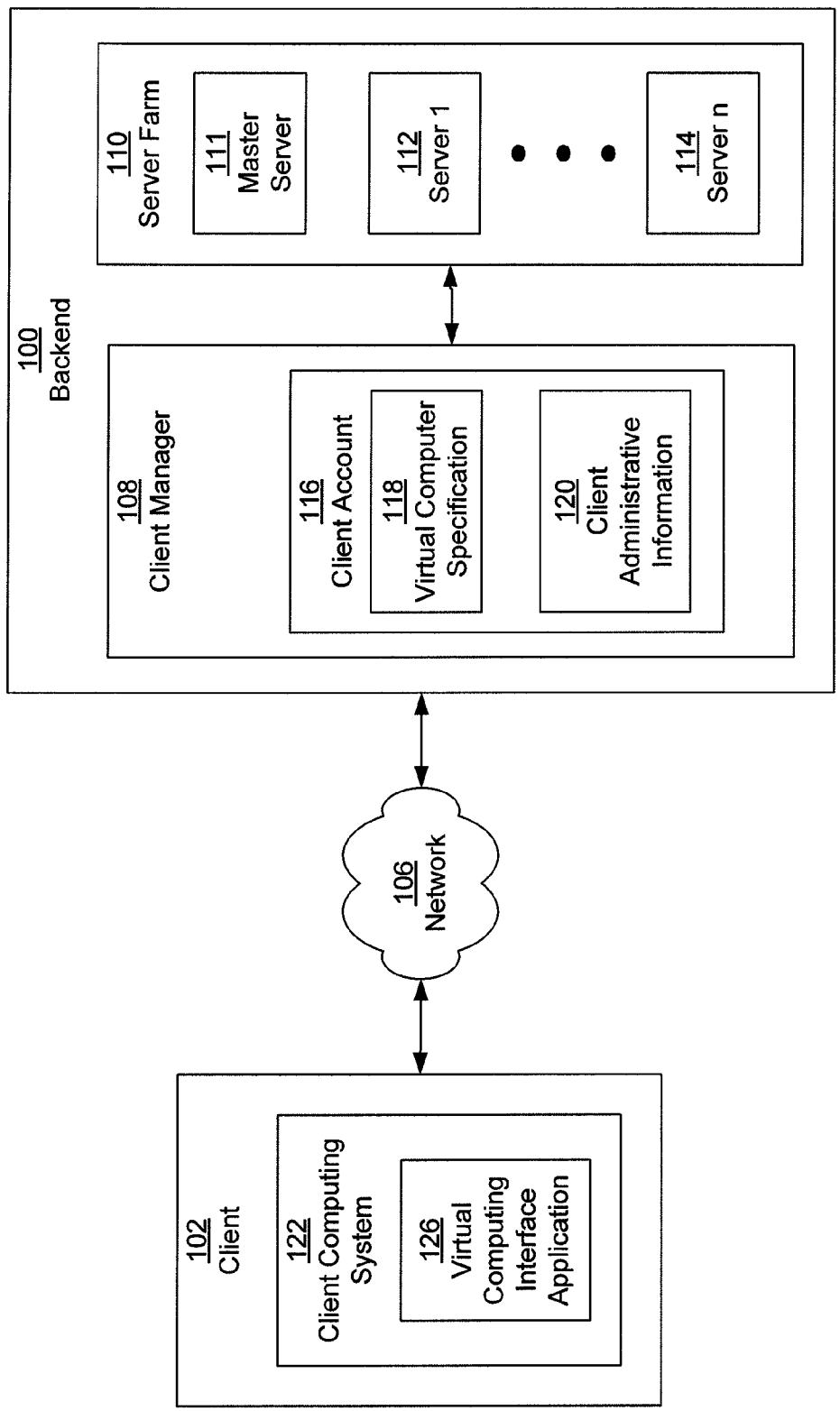
FIG. 1 shows a schematic diagram of a system for virtual computing in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for virtual computing. Specifically, embodiments of the invention provide a mechanism for a user to configure a virtual computer and execute instructions immediately following the configuration of the virtual computer. A virtual computer corresponds to a group of remote computing resources (e.g., hardware and software) that operate cooperatively to appear as a single computing unit. In one or more embodiments of the invention, a user may interact with the virtual computer as if the virtual computer were a complete local machine (e.g., operating system, applications, hardware, etc. operating collectively). Further, in accordance with one or more embodiments of the invention, a user may specify all requirements for a new computer system and obtain immediate access to the new computer system (i.e., a virtual computer).

FIG. 1 shows a schematic diagram of a system for virtual computing in accordance with one or more embodiments of the invention. As shown in FIG. 1, the system includes a backend (100), a client (102), and a network (106). Each of these components is described below.

In accordance with one or more embodiments of the invention, a backend (100) corresponds to a group of connected servers that include functionality to create and execute a virtual computer. The backend (100) includes a server farm (110) and a client manager (108).

A server farm (110) corresponds to connected servers (e.g., server 1 (112), server n (114)). Each server (e.g., server 1 (112), server n (114)) is associated with at least one computing resource. A computing resource corresponds to any type of hardware or software resource that may be used to execute a virtual computer. For example, a computing resource may correspond to a memory device, processor(s), network devices, or any other type of hardware associated with a computer system or database applications, operating system applications, software development application, or any application for execution on a computer system.

In one or more embodiments of the invention, the servers (e.g., server 1 (112), server n (114)) are dedicated to specific tasks such as a database server to manage a variety of databases, a server devoted to software development applications, business logic servers, and other such dedicated tasks. Alternatively, the servers (e.g., server 1 (112), server n (114)) may be maintained in a state with only essential software installed. Specifically, when not in use, software may be removed from the server.

Furthermore, in one or more embodiments of the invention, the server farm (110) has a master server (111). The master server (111) includes functionality to orchestrate provisioning on the servers (e.g., server 1 (112), server n (114)) and to coordinate the execution of one or more servers. Coordinating the execution of the servers allows the virtual computer to appear as if a user were using a single computer system.

Additionally, those skilled in the art will appreciate that all or part of the servers in the server farm may not be directly under the control of the backend. Specifically, commands may also be sent to a third party for actual processing.

Continuing with FIG. 1, the backend (100) also includes a client manager (108). A client manager (108) corresponds to any type of mechanism (e.g., person, computer system, or other such mechanism) that includes functionality to manage information for a particular client (102) (described below). Accordingly, the client manager (108) includes a client account (116) for each client.

In one or more embodiments of the invention, a client account (116) corresponds to a storage area (e.g., file, entry in a database, etc.) that maintains the information for a client. The client account (116) includes at least one virtual computer specification (118) and client administrative information (120). In one or more embodiments of the invention, the virtual computer specification (118) corresponds to configuration requirements. In particular, the configuration requirements include both hardware and software requirements.

Hardware requirements correspond to any requirement related to hardware. For example, the hardware requirements may specify at least one central processing unit (e.g., speed and/or type), amount and type of memory (e.g., random access memory (RAM), read only memory (ROM), disks, and other memory devices), type of storage system, partitioning of storage, type of storage redundancy (e.g., redundant array of independent disks (RAID) 0, RAID 1, etc.), type of system (e.g., personal computer, distributed computer, etc.), any connection mechanisms, and other such requirements for hardware.

The software requirements correspond to any requirement related to software. For example, the software requirements may specify the operating system (e.g., vendor, product, release level, configuration of operating system, and other such operating system requirements), database application, web browser, file system management application, office applications (e.g., word processor, spreadsheet, slides, and other such applications), testing applications for quality assurance of software, technical and mathematical applications, and any other software and configuration thereof.

Further, virtual computer specification (118) may also include a duration requirement. Specifically, a duration requirement corresponds to an amount of time (e.g., days, weeks, months, etc.) in which the client (102) desires to use the virtual computer. The duration requirement may specify a total amount of time in which the computing resources should be dedicated to client, in accordance with one or more embodiments of the invention. Specifically, during the time the computing resources are dedicated to a client, regardless of whether the computing resources are in use, the computing resources are not re-provisioned for other clients. Alternatively, a duration requirement may specify the time of actual use of the computing resources in accordance with one or more embodiments of the invention. Specifically, a duration requirement may specify that the amount of time in which a user is logged onto the virtual computer or in which commands are executed by the virtual computer.

Further, in one or more embodiments of the invention, the duration requirement is configurable. Specifically, a user may specify a projected time period for use of the virtual computer and change the duration requirement when the client has a better projected time period. Additionally, the duration requirement may be for the entire virtual computer or for only specific hardware and/or software components of the virtual computer. For example, a client may specify a duration requirement for an application used in software development and a separate duration requirement for an application used in software testing.

Continuing with FIG. 1, the client account (116) also includes client administrative information (120). Client administrative information (120) corresponds to any non-technical information related to the client. For example, in one or more embodiments of the invention, client administrative information (120) corresponds to billing information (e.g., addresses, phone numbers, monetary amounts, and other such billing information).

Continuing with the backend (100), in one or more embodiments of the invention, the backend (100) may also include a separate storage unit for the client (102). Specifically, a client may desire to have storage independent of the virtual computer. By having a separate storage, the data may be accessed by multiple virtual computers independent of time. Thus, in one or more embodiments of the invention, a user does not have to remove the data between uses of one or more virtual computers. Further, a user may use the data between simultaneous executions of multiple virtual computers in accordance with one or more embodiments of the invention.

Further, the backend (100) may also include one or more web commerce servers (not shown) with web commerce applications allowing creation of the virtual computer in accordance with one or more embodiments of the invention. The web commerce server communicates with the client manager (118) to store data in the client account based on interaction with the client (102).

Continuing with FIG. 1, a client (102) is connected to the backend (100) via a network (106) in accordance with one or more embodiments of the invention. The network may correspond to a local area network, wide area network (e.g., Internet) or any other mechanism for connection of components.

The client (102) corresponds to an individual, company, or organization that includes functionality to use and/or create a virtual computer. In one or more embodiments of the invention, creating a virtual computer by the client (102) corresponds to sending the specification for the virtual computer, buying the virtual computer, or performing any other such tasks that lead to the provisioning of a virtual computer. The client includes at least one client computing system (122) in accordance with one or more embodiments of the invention.

The client computing system (122) corresponds to a unit (e.g., laptop computer, desktop computer, personal digital assistant (PDA), embedded computer, or any other such device) that includes functionality to access the network (106). Specifically, the client computing system (122) includes functionality to interact with the backend (100) through the network (106) or any other device that has access to a network. Because processing is performed by the virtual computer, the client computing system does not necessarily have strenuous hardware or software requirements in accordance with one or more embodiments of the invention. Rather, the client computing system (122) may be several years or even decades outdated with respect to the technological knowledge at the time of the use of the virtual computer.

The client computing system (122) has a virtual computing interface application (126). The virtual computing interface application corresponds to an application that can access a network (106). For example, the virtual computing interface application (106) may correspond to a remote desktop sharing mechanism (e.g., virtual network computing application), browser (e.g., an Internet browser), application such as secure shell (ssh), telnet, etc., or any other such mechanism for accessing the network (106).

Figure 2:
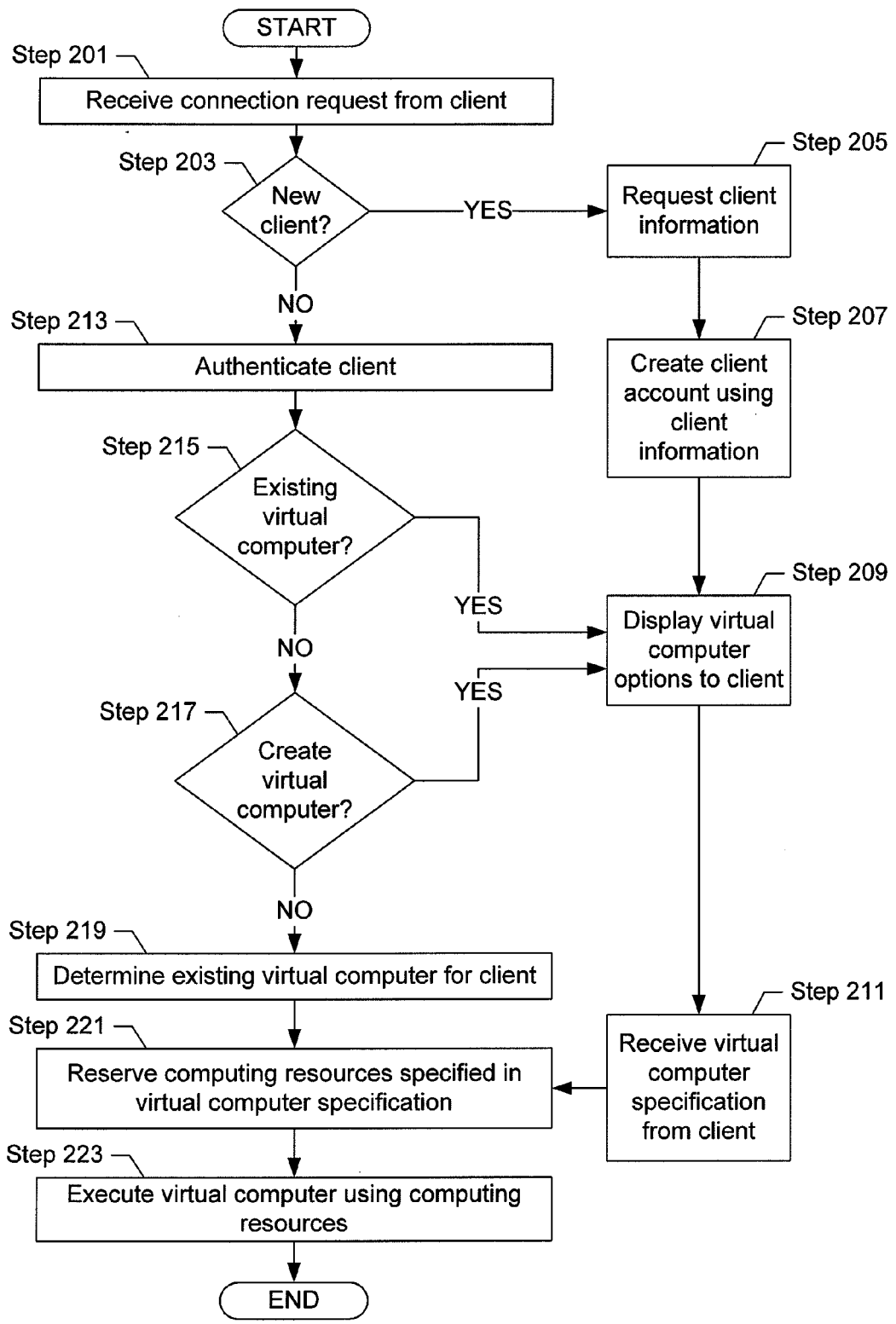
FIG. 2 shows a flowchart of a method of a user interface for creating a virtual computer in accordance with one or more embodiments of the invention.

By using the client computing system (122), a user is able to create and interact with a virtual computer. FIG. 2 shows a flowchart of a method of a user interface for creating a virtual computer in accordance with one or more embodiments of the invention. Initially, a connection request is received from a client (Step 201). The connection request may be received by a client accessing the backend for the first time from the computing system. In such scenario, the connection request may be the client accessing the backend using a browser and typing in the network address (e.g., uniform resource locator (URL) or uniform resource identifier (URI)) of the backend in the browser. Alternatively, the client may have a client side application that when instantiated automatically connects to the backend.

Once the connection request is received by the backend, a determination is made whether the client is new (Step 203). A client is considered new if a client account does not exist for the client. Accordingly, if the client is new, then the client information is requested (Step 205). Requesting client information may be performed by submitting a questionnaire of billing and/or address information to the client. Those skilled in the art will appreciate that the client information may alternatively be requested after a first creation of a virtual computer by the client.

Next, the client account is created for the client using the client information (Step 207). Specifically, the storage is set aside for the client and the client account is populated with data. One skilled in the art will appreciate that creating the client account may be performed while or after the client information is being received from the client.

Continuing with FIG. 2, the virtual computer options are displayed for the client (Step 209) in accordance with one or more embodiments of the invention. At this stage, the client is able to view optional hardware or software requirements for creating a virtual computer.

Either after or while the virtual computer options are being displayed, a virtual computer specification is received from the client (Step 211). Specifically, the client may submit the specification with hardware and software requirements in batch or interactively (e.g., by entering hardware and software requirements in successive forms).

Those skilled in the art will appreciate that rather than displaying the virtual computer options to the client, the client may simply submit a virtual computer specification without viewing the options.

While the virtual computer specification is being received or after the entire specification is received, the computing resources specified in the virtual computer specification is reserved for the client (Step 221). Specifically, the computing resources are provisioned for use by the client (described below in FIG. 3).

Next, the virtual computer is executed using the computing resources (Step 223) (described below in FIG. 4).

Alternatively, if the client is determined to be an existing client, then the client is authenticated (Step 213). In one or more embodiments of the invention, authenticating the client corresponds to performing secure transfer of login information (i.e., unique user identifier and password). Those skilled in the art will appreciate that either all or part of the correspondence between the client and the backend may be encrypted.

Once the client is authenticated, then a determination is made whether an existing virtual computer exists (Step 215). If an existing virtual computer does not exist because the client has not created a virtual computer or because the previous virtual computer have surpassed a duration set in the specification associated with the virtual computer, then the client must create a new virtual computer in accordance with one or more embodiments of the invention. Accordingly, the virtual computing options are displayed for the client (Step 209).

Alternatively, if a virtual computer exists, then in one or more embodiments of the invention, a determination is made whether the client wants to create another virtual computer or modify an existing virtual computer (Step 217). Specifically, at this stage, in one or more embodiments of the invention, the client is queried as to whether the client wants to create a virtual computer. If the client wants to create a virtual computer, then the virtual computing options are displayed for the client (Step 209).

Alternatively, if a virtual computer is not to be created or modified, then an existing virtual computer is determined (Step 219). Specifically, if more than one virtual computer for the client exists, then the client may choose which virtual computer to use in accordance with one or more embodiments of the invention. Alternatively, if only one virtual computer exists, then the specification and/or computing resources for the virtual computer is obtained. Next, in one or more embodiments of the invention, the computing resources for existing virtual computer are reserved for the client (Step 221).

In an alternative embodiment of the invention, computing resources associated with a pre-existing virtual computer are always reserved for use by the client during a duration specified in the specification, regardless of whether the client is logged on. Accordingly, the computing resources are not re-provisioned for the client (Step 223). Thus, the virtual computer is ready for execution (Step 223).

Figure 3:
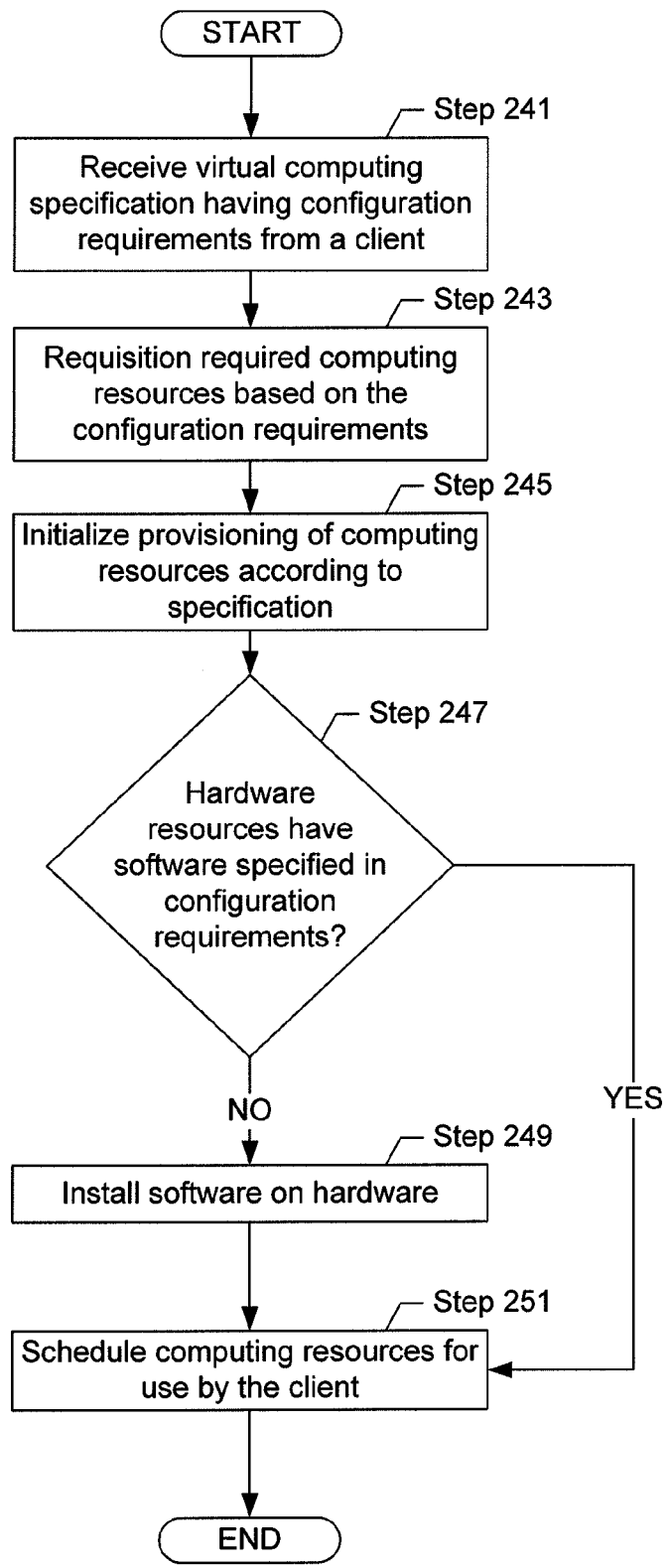
FIG. 3 shows a flowchart of a method of background processing for creating a virtual computer in accordance with one or more embodiments of the invention.

FIG. 3 shows a flowchart of a method of background processing for creating a virtual computer in accordance with one or more embodiments of the invention. Specifically, FIG. 3 shows a method for creating a virtual computer by the backend. Initially, a virtual computing specification having configuration requirements is received from the client (Step 241). The configuration requirements are used to requisition the required computing resources (Step 243). Specifically, at this stage, the available hardware matching the requirements in the specification is determined. Those skilled in the art will appreciate that because a client may request a personal computer based virtual computer, certain translation to a server-based system of the virtual computing specification may be required.

After the required computing resources are requisitioned, the provisioning of the computing resources from a pool of available hardware and software resources is initialized (Step 245). More specifically, the specification is compared with the available hardware resources to determine the most efficient use of the hardware resources. Accordingly, next a determination is made whether any available hardware resources have the software specified in the configuration requirements already installed (Step 247). For example, if previously, another client required the same specific operating system and hardware configuration, then the software and hardware configuration may be used for the current client. Those skilled in the art will appreciate that any remaining data on the hardware of the previous client is removed in accordance with one or more embodiments of the invention.

If all hardware resources have the software in the configuration requirements and all configuration requirements are achieved, then the computing resources are scheduled for use by the client (Step 251). In other words, the client is given access to the computing resources.

Alternatively, if any of the configuration requirements are not achieved by the pool of computing resources, then the software is installed on the hardware (Step 249). Specifically, in one or more embodiments of the invention, a partition is created on the server and the software specified in the configuration requirements are installed on the server according to the configuration requirements.

Next, the computing resources are scheduled for use by the client (Step 251). Accordingly, the client can execute commands on the computing resource.

As described in FIG. 2, in one or more embodiments of the invention, provisioning the virtual computer may be performed while the virtual computing specification is being received. Accordingly, the steps performed in FIG. 3 may be performed while the client is sending the virtual computing specification thereby allowing for immediate use of the virtual computer by the client.

Figure 4:
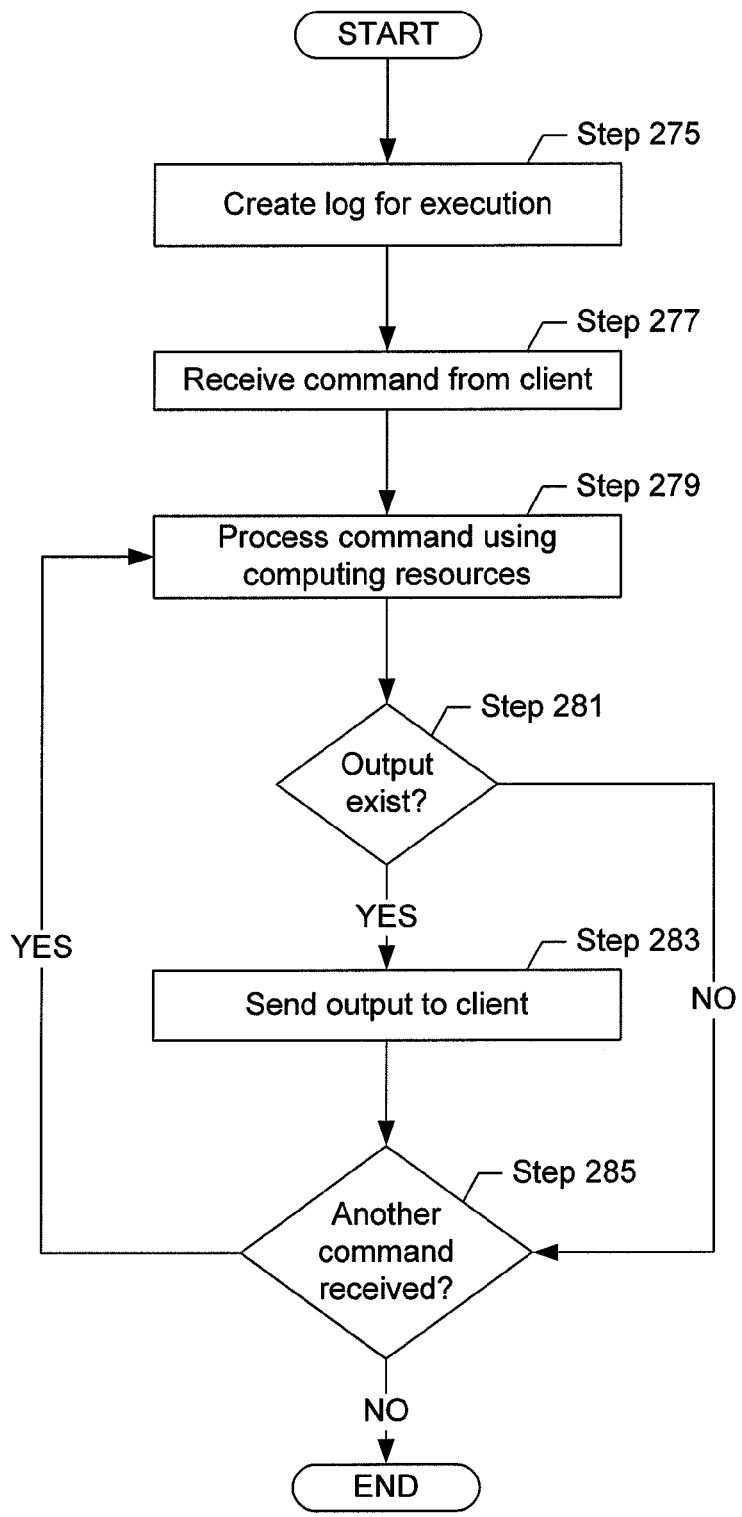
FIG. 4 shows a flowchart of a method for processing by a virtual computer in accordance with one or more embodiments of the invention.

FIG. 4 shows a flowchart of a method for processing by a virtual computer in accordance with one or more embodiments of the invention. Initially a log for execution is created for the user (Step 275). The log may be use to keep track of commands being sent to the virtual computer for ensuring that data loss does not occur. The log may also be used to save the amount of time a user is using the virtual computer for billing purposes.

After the log is created, a first command is received from the client (Step 277). The first command may be to open an application or perform any other such function. Next, the command is processed using the computing resources of the virtual computer (Step 279). Processing the command may involve a master server intercepting the command, determining the appropriate server to process the command and sending the command to the server. Alternatively, the command may be sent immediately to a server with at least a partition dedicated to the client. The server may then process the command using the software on the client.

While processing the command, a determination is made whether the results should be outputted from processing the command (Step 281). Specifically a determination is made whether results are generated to be displayed. If results for display are generated, then the results are sent to the client (Step 283). When the virtual computing interface application receives the results, the virtual computing interface application displays the result on a display device of the client. Displaying the results may include reformatting the results for the display size of the display device for the client. For example, if results are generated for a laptop computer and the client computing system is a PDA, then the results may be reformatted to fit the display device (i.e., screen) of a PDA. Alternatively, if results are generated for storage (e.g., a file is to be populated with the results), then the results are sent to storage. For example, the results may be saved to a log file to allow the client to view the results at a later date. Further, storage of the results may be on the client computer or on the virtual computer.

After processing the command, a determination is made whether another command is received (Step 285). If another command is received, then the processing of the next command is performed. Alternatively, if the last command is to exit the virtual computer, then the log is closed and the connection between the backend and the servers ended.

Once the duration of the virtual computer has ended, then the backend may erase files and results the client has produced in order to free resources for another client. Alternatively, the client's results and files may be sent to the client when the duration expires to allow the client to store the results and files locally on the client computer system.

As another alternative, the backend may save the clients results and files in storage either permanently or for a period of time. Specifically, the client results and files may be sent to a backend storage server. The client may then access the backend storage server at a later date through another virtual computer or through a web interface.

For the following example, consider the case when the client is a mid-size software development company. Further, the mid-size software development company generally uses an operating system called CliOS and has a six-month contract to build an application for a completely different operating system called ConOS that is to execute on hardware not available at the mid-size software development company.

First, in one or more embodiments of the invention, the exemplary software development company creates a client account at the client manager. Next, the exemplary software development company creates virtual computer for each of the employees that are to create and test the software. In the specification for the virtual computers, the operating system requirement is ConOS and the hardware requirement matches hardware that the application on which the application will be executed. Further, the software development company may link the created virtual computers and add to the software requirements a file management programs as well as a testing and development program. Additionally, the mid-size software development company sets the duration as six months, in accordance with one or more embodiments of the invention.

In one or more embodiments of the invention, while the software development company is sending the virtual computing specifications to the backend, the backend is provisioning the servers for the virtual computers. Accordingly, the employees of the software development company may immediately use the virtual computers.

Thus, after the virtual computers are provisioned, a virtual computing interface application is added to the desktops of each of the employees. The software developers may now create and test the software in an environment that the software on which the software is designed to be executed. Accordingly, the mid-size software development company does not have to invest in a system that will only be used for six months. Further, employees of the mid-size company may immediately develop and test the software without waiting until any physical hardware arrives and is configured at the company.

Figure 5:
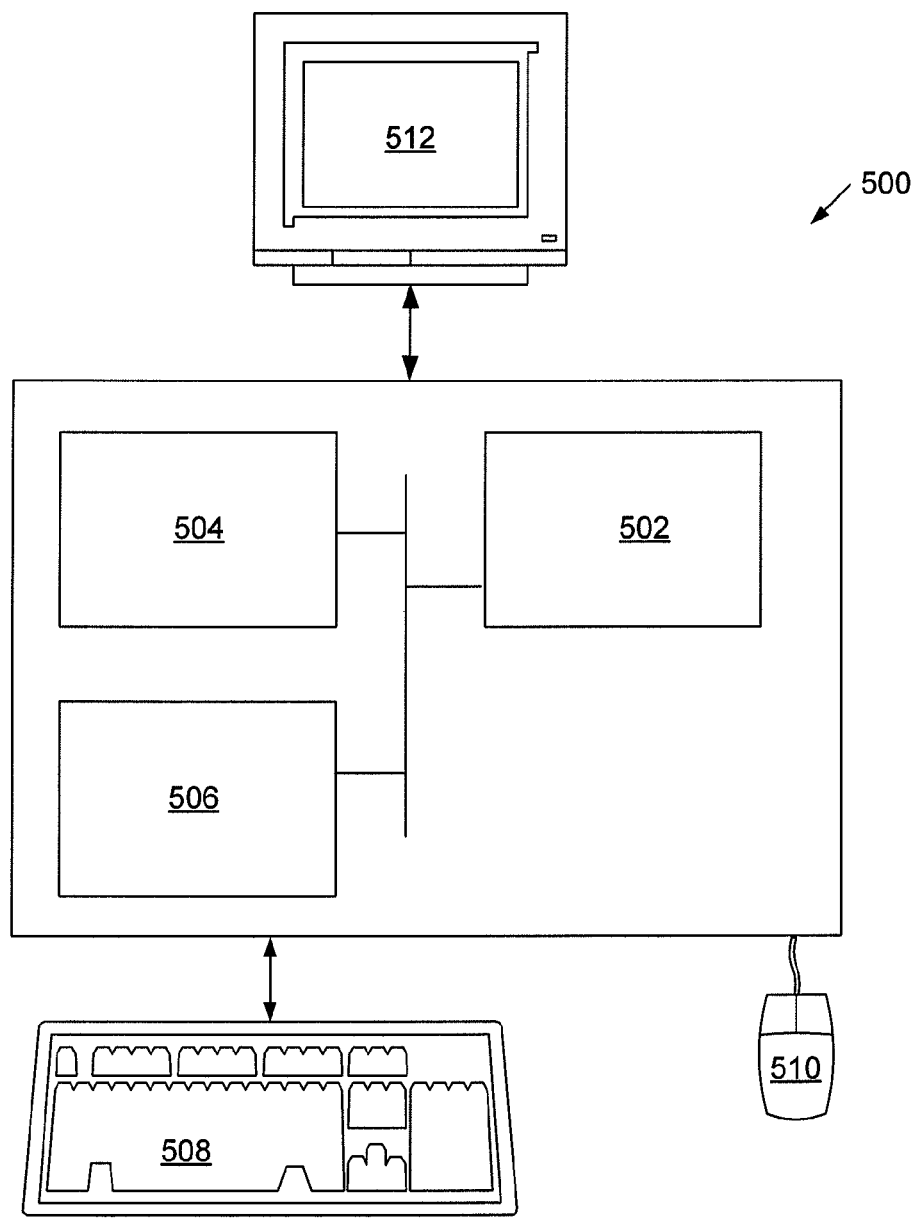
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., client manager, client account, client administrative information, etc.) may be located on a different node within the distributed system. In one embodiment of the invention, the node corresponds to a computer system. Alternatively, the node may correspond to a processor with associated physical memory. The node may alternatively correspond to a processor with shared memory and/or computing resources. Further, software instructions to perform embodiments of the invention may be stored on a computer readable medium such as a compact disc (CD), a diskette, a tape, a file, or any other computer readable storage device.

Embodiments of the invention allow a client to execute commands on a continually updated system without having to invest continually in new computer systems. Further, embodiments of the invention assist a mobile user to use a machine that may be far more powerful than the machine available to the mobile user. For example, from a PDA, laptop, or other such device, a mobile user is able to send commands and execute instructions as if the mobile user is using a specialized computer system with different hardware and software specifications.

Additionally, embodiments of the invention provide near instant network access to a customized computer system. Specifically, users are not required to wait from the time of order until the system arrives to execute instructions on the computer system.

In addition, a system administrator at the client does not have to provision software on the computer system. Rather, the software is automatically provisioned on the backend.

Moreover, clients which only require a specialized computer system for a specific period of time are not required to purchase the specialized computer system. Rather, the client may merely create a virtual computer and purchase time on the virtual computer.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for virtual computing comprising:

receiving, from a client, a first virtual computer specification, wherein the first virtual computer specification defines a plurality of hardware and software configuration requirements for a first virtual computer and a duration requirement for use of the first virtual computer;

requisitioning a first plurality of computing resources based on the plurality of hardware and software configuration requirements;

provisioning the first plurality of computing resources to obtain a first provisioned virtual computer, wherein the first provisioned virtual computer appears to the client as a single computer system;

creating, for the client, a client account comprising a plurality of administrative information and a client data storage;

scheduling the first plurality of computing resources of the first provisioned virtual computer for use based on the duration requirement;

receiving, after scheduling, a command to be executed on the first provisioned virtual computer;

identifying, after receiving the command, the first plurality of computing resources of the first provisioned virtual computer;

processing, by a processing server, the command using at least one of the first plurality of computing resources to generate a result, wherein the result is stored in the client data storage;

reclaiming the first plurality of computing resources at an end of a duration specified by the duration requirement;

receiving, from the client, a second virtual computer specification for a second virtual computer;

requisitioning a second plurality of computing resources based on the second virtual computer specification;

provisioning the second plurality of computing resources to obtain a second provisioned virtual computer; and associating the client data storage with the second provisioned virtual computer, wherein the client accesses the result stored in the client data storage from the second provisioned virtual computer.

2. The method of claim 1, wherein a computing resource of the first plurality of computing resources is a database application.

3. The method of claim 1, further comprising billing the client for using the first plurality of computing resources.

4. The method of claim 1, wherein the first plurality of computing resources is located at a datacenter.

5. The method of claim 1, wherein provisioning the first plurality of computing resources comprises:

determining whether an application specified by a software configuration requirement of the plurality of hardware and software configuration requirements is installed on an available processing server specified by a hardware configuration requirement of the plurality of hardware and software configuration requirements; and installing the application if the application is not installed on the available processing server.

6. The method of claim 1, wherein receiving the first virtual computer specification is performed interactively.

7. The method of claim 1, wherein the first plurality of computing resources are scheduled for use directly after provisioning.

8. The method of claim 1, wherein the plurality of hardware and software configuration requirements comprises an operating system requirement.

9. The method of claim 1, wherein the plurality of hardware and software configuration requirements comprises a processing requirement and a memory requirement.

10. A system for virtual computing comprising:
a processing server comprising hardware;
a client manager configured to:
receive, from a client, a first virtual computer specification, wherein the first virtual computer specification defines a plurality of hardware and software configuration requirements for a first virtual computer and a duration requirement for use of the first virtual computer; and
requisition a first plurality of computing resources based on the plurality of hardware and software configuration requirements;
create, for the client prior to scheduling the first plurality of computing resources, a client account comprising a plurality of administrative information and a client data storage, wherein a result is stored in the client data storage;
reclaim the first plurality of computing resources at an end of a duration specified by the duration requirement;
receive, from the client, a second virtual computer specification for a second virtual computer; and
requisition a second plurality of computing resources based on the second virtual computer specification; and a master server connected to the client manager and configured to:
provision the first plurality of computing resources to obtain a first provisioned virtual computer, wherein the first provisioned virtual computer appears to the client as a single computer system;
schedule the first plurality of computing resources of the first provisioned virtual computer for use based on the duration requirement;
receive, after scheduling, a command to be executed on the first provisioned virtual computer;
select the processing server to process the command based on the processing server comprising at least a portion of the first plurality of computing resources of the first provisioned virtual computer;
provision the second plurality of computing resources to obtain a second provisioned virtual computer; and
associate the client data storage with the second provisioned virtual computer,
wherein the processing server processes the command using at least one of the first plurality of computing resources to generate the result, and
wherein the client accesses the result from the second provisioned virtual computer.

11. The system of claim 10, wherein the client manager is further configured to bill the client for using the first plurality of computing resources.

12. The system of claim 10, wherein the first plurality of computing resources are physically located at a datacenter.

13. The system of claim 10, wherein provisioning the first plurality of computing resources comprises:
determining whether an application specified by a software configuration requirement of the plurality of hardware and software configuration requirements is installed on an available processing server specified by a hardware configuration requirement of the plurality of hardware and software configuration requirements; and
installing the application if the application is not installed on the available processing server.

14. The system of claim 10, wherein receiving the first virtual computer specification is performed interactively.

15. The system of claim 10, wherein the first plurality of computing resources are scheduled for use directly after provisioning.

16. The system of claim 10, wherein the plurality of hardware and software configuration requirements comprises an operating system requirement.

17. A non-transitory computer usable medium comprising computer readable program code embodied therein for causing a computer system to:
receive, from a client, a first virtual computer specification, wherein the first virtual computer specification defines a plurality of hardware and software configuration requirements for a first virtual computer and a duration requirement for use of the first virtual computer;
requisition a first plurality of computing resources based on the plurality of hardware and software configuration requirements;
provision the first plurality of computing resources to obtain a first provisioned virtual computer, wherein the first provisioned virtual computer appears to the client as a single computer system;
create, for the client, a client account comprising a plurality of administrative information and a client data storage, schedule the first plurality of computing resources of the first provisioned virtual computer for use based on the duration requirement;

receive, after scheduling, a command to be executed on the first provisioned virtual computer;

identify, after receiving the command, the first plurality of computing resources of the first provisioned virtual computer, wherein the first plurality of computing resources is located on a processing server, wherein the processing server processes the command using at least one of the first plurality of computing resources to generate a result, and wherein the result is stored in the client data storage;

reclaim the first plurality of computing resources at an end of a duration specified by the duration requirement;

receive, from the client, a second virtual computer specification for a second virtual computer;

requisition a second plurality of computing resources based on the second virtual computer specification;

provision the second plurality of computing resources to obtain a second provisioned virtual computer; and associate the client data storage with the second provisioned virtual computer, wherein the client accesses the result from the second provisioned virtual computer.

18. The non-transitory computer usable medium of claim 17, wherein the remote use of the first plurality of computing resources is performed with a remote desktop application.

* * * * *